(12) United States Patent
Boroch et al.

(10) Patent No.: US 7,850,047 B2
(45) Date of Patent: Dec. 14, 2010

(54) SYSTEM AND METHOD FOR TRANSPORTING MEASURED AMOUNTS OF BULK MATERIALS

(75) Inventors: Anthony E. Boroch, Montoursville, PA (US); Curtis Wykoff, Hughesvile, PA (US)

(73) Assignee: The Young Industries, Inc., Muncy, PA (US)

( * ) Notice: Subject to any disclaimer, the term of this patent is extended or adjusted under 35 U.S.C. 154(b) by 1363 days.

(21) Appl. No.: 11/033,510

(22) Filed: Jan. 12, 2005

(65) Prior Publication Data

US 2006/0151053 A1    Jul. 13, 2006

(51) Int. Cl.
*B67D 7/06* (2010.01)
(52) U.S. Cl. ....................... 222/181.2; 222/57
(58) Field of Classification Search .................. 222/181, 222/195, 504, 55–99, 181.1, 181.2, 185.1, 222/251–290; 141/83, 67, 302, 286, 114; 406/89, 95, 11, 169, 91; 414/328, 397
See application file for complete search history.

(56) References Cited

U.S. PATENT DOCUMENTS

| | | | | |
|---|---|---|---|---|
| 6,609,871 B2 * | 8/2003 | Pfeiffer et al. | .............. | 414/328 |
| 6,719,500 B2 * | 4/2004 | Pfeiffer et al. | ................ | 406/91 |
| 6,764,253 B1 * | 7/2004 | Pfeiffer | ........................ | 406/11 |
| 7,137,759 B1 * | 11/2006 | Ambs | ........................... | 406/55 |
| 7,191,807 B2 * | 3/2007 | DeMaison et al. | ............ | 141/83 |
| 7,231,947 B2 * | 6/2007 | Boroch et al. | ................ | 141/286 |
| 2003/0081495 A1 * | 5/2003 | O'Callaghan | ................ | 366/141 |
| 2005/0269369 A1 * | 12/2005 | Pfeiffer et al. | .............. | 222/367 |

OTHER PUBLICATIONS

U.S. Appl. No. 10/862,573, filed Jun. 8, 2004, Anthony E. Boroch et al.
U.S. Appl. No. 10/858,206, filed Jun. 2, 2004, John W. Pfeiffer.

* cited by examiner

*Primary Examiner*—Lien T Ngo
(74) *Attorney, Agent, or Firm*—Novak Druce + Quigg LLP

(57) ABSTRACT

A system for transporting measured amounts of bulk material from a first site to a remote site generally comprising means for holding a mass of material to be transported to the receptacle; means for transporting the material from the holding means to the receptacle; means for injecting a gas under pressure into the transporting means for pneumatically conveying material received from the holding means to the receptacle, operable in continuous and intermittent modes; means for sensing the weight of the receptacle; and a programmable logic controller operatively connected to the sensing means and the injecting means, operable responsive to a weight of the receptacle up to a first weight for operating the injection means in the continuous mode, a weight of the receptacle between the first weight and up to a second weight greater than the first weight for operating the injection means in the intermittent mode and to the second weight for discontinuing the injection means.

50 Claims, 2 Drawing Sheets

SYSTEM AND METHOD FOR TRANSPORTING MEASURED AMOUNTS OF BULK MATERIALS

This invention relates to a system and method for transporting measured amounts of bulk materials between selected sites. The invention further contemplates the transportation of measured amounts of fine bulk materials having poor flow characteristics.

BACKGROUND OF THE INVENTION

In many bulk material handling and processing operations, it often is required to transport materials from one location, usually a storage site, to another location, often another storage site or processing facility, in measured amounts. Because of the nature of the material to be transported, the conveyance of the material and the control of the desired amount of material being conveyed are often difficult to achieve. This particularly is the situation in handling and processing fine bulk materials such as carbon black, titanium oxide and similar materials. Typically, such materials are pneumatically conveyed but such method is not always effective due to poor flowability, clogging and inconsistent flow of material. In addition, most prior art systems being of a dedicated nature, lack the capability of being disassembled and reassembled to provide different material routing paths to accommodate different processes involving different equipment configurations.

Accordingly, it is the principal object of the present invention to provide a system and method for conveying precisely measured amounts of bulk materials from one site to another, rapidly and effectively without the deterioration or loss of material, in which the system may be reconfigured to provide a variety of paths for routing the material. A further object of the invention is to provide such a system providing for ease of installation, flexibility in routing of the material and ease of cleaning.

SUMMARY OF THE INVENTION

The objects of the present invention are achieved generally by providing a system for transporting a measured amount of a bulk material from a first site to a remote receptacle, comprising means for holding a mass of the material to be transported to the receptacle; means for transporting the material from the holding means to the receptacle; means for injecting a gas under pressure into the transporting means for a pneumatically conveying material received from the holding means to the receptacle, operable in continuous or pulsating modes; means for sensing the net weight of the receptacle; and a programmable logic controller operatively connected to the sensing means and the gas injecting means, operable responsive to a net weight of the receptacle up to a first net weight for operating the gas injection means in the continuous mode thereof, a net weight of the receptacle between the first net weight and up to a second net weight greater than the first net weight for operating the gas injection means in the pulsating mode thereof and to the second net weight for discontinuing the gas injection means. In enhancing the control of the amount of material being conveyed, a rotary feed valve having a rotor driven by a motor is provided for feeding material from the holding means to the transporting means, in which the controller further functions responsive to a weight of the receptacle up to the first weight for operating the drive motor at a first speed, a weight of the receptacle between the first weight of the receptacle and up to the second weight greater than the first weight for operating the drive motor at a second speed lower than the first speed and to the second weight of the receptacle for discontinuing the drive motor. In further enhancing the flowability of the material a fluidizing gas is supplied to the holding means, transporting means and rotary feed valve when used.

DETAILED DESCRIPTION OF THE EMBODIMENTS OF THE INVENTION

Figure 1:
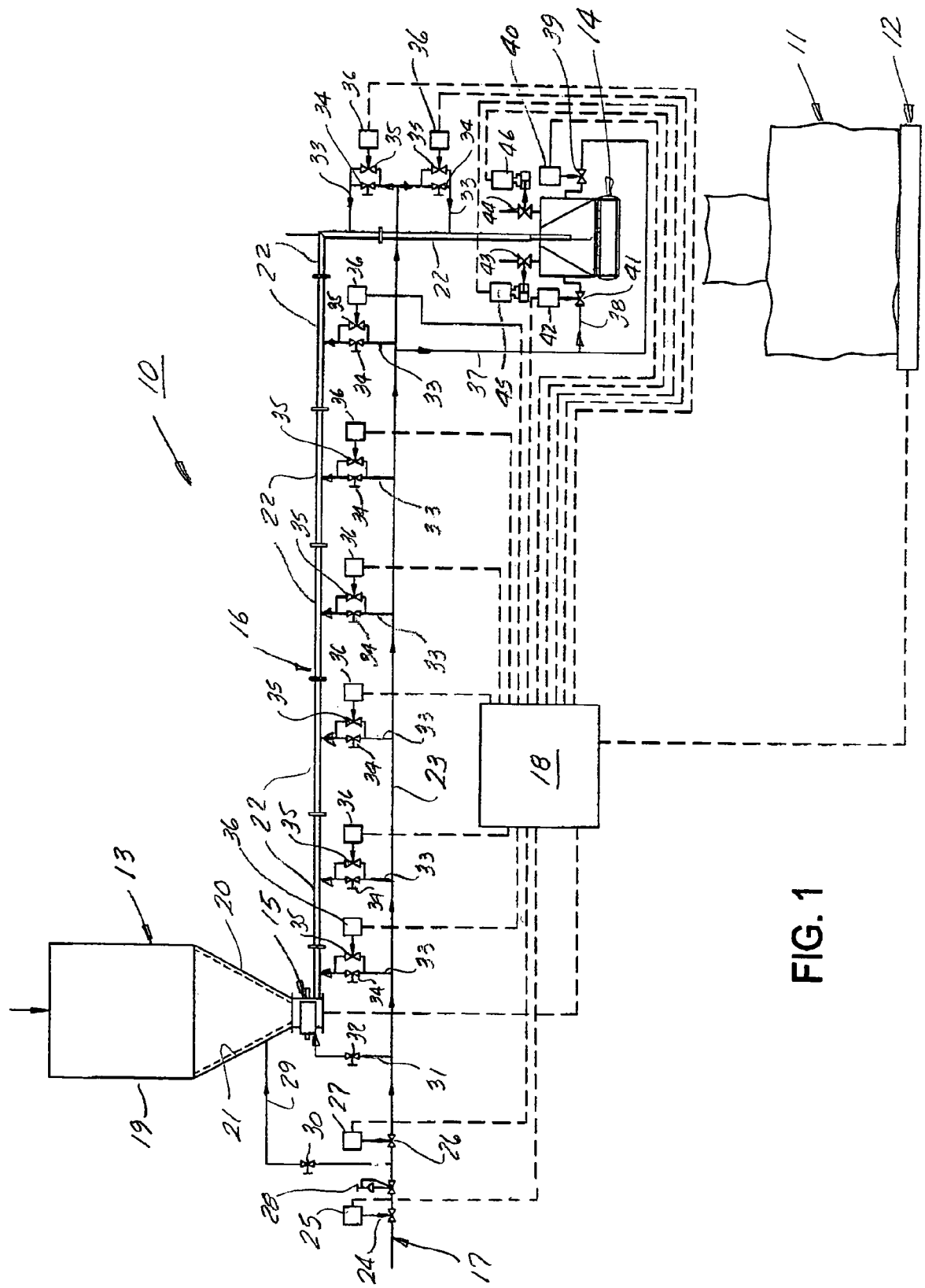
FIG. 1 is a diagrammatic-schematic view of a system for transporting measured amounts of bulk material from one site to another, embodying the present invention.

Referring to FIG. 1 of the drawings, there is illustrated a system 10 for conveying a measured amount of fine bulk material to a container 11 which generally includes a weighing scale 12 on which the receptacle is supported, a material holding vessel 13, a material filling apparatus 14 located remotely from holding vessel 13 and cooperable with an access opening of receptacle 11, a rotary feed valve assembly 15 adapted to receive material from holding vessel 13 through gravity flow, a material transport line 16 interconnecting rotary feed valve assembly 15 and filling apparatus 14, a gas supply system 17 and control unit 18 operatively connected to solenoids for actuating various valves of the gas supply system, and weight scale 12. Holding vessel 13 is of an essentially conventional construction including an upper, cylindrical section 19 and a lower hopper section 20 communicating with the upper section, having a lower discharge opening and optionally a liner 21 of a porous material spaced inwardly from the converging side wall thereof. Rotary feed valve assembly 15 consists of a housing having an inlet communicating with the discharge opening of the holding vessel, an outlet, a rotor disposed within the valve housing and operable to carry material received from the holding vessel to the outlet thereof and a variable speed electric motor operatively connected to the valve rotor. A more detailed illustration and description of such assembly is provided in U.S. patent application Ser. No. 10/858,206 filed Jun. 2, 2004 which is incorporated herein by reference.

Filling apparatus 14 generally includes a substantially cylindrical housing having a closed upper end with an opening disposed axially relative to the housing side wall, and a lower open end about which an access spout of receptacle 11 may be fitted. Mounted on the lower, outer side of the housing is an annular bladder which may be inflated when the access spout of the receptacle is fitted around the lower end of the housing to provide a seal between the filler apparatus and the receptacle. The upper, interior portion of the housing is provided with a frusto-concially configured filter material which further is provided with a pair of partition walls disposed radially relative to the axis of the housing to provide two separate, upper compartments of the apparatus. A more detailed illustration and description of such apparatus is provided in U.S. patent application Ser. No. 10/862,576 filed Jun. 8, 2004 which is incorporated herein by reference.

Material transport line 16 consists of a plurality of sections 22 detachably connected together in end-to-end relation to form the material transport line extending from the outlet of rotary feed valve assembly 15 to filling apparatus 14. Each of such sections includes an inner conduit formed of a pervious material, an outer conduit formed of an impervious material encompassing and spaced from the inner conduit and a pair of annular flanges on the ends thereof providing an axial material passageway surrounded by an annular plenum. The annular end flanges are provided with registrable bolt holes for receiving connecting bolts or may be provided with other means for connecting adjacent flanges together to configure the sections in end-to-end relation. The sections are selected from a group of sections having straight, angled or curved configurations and are detachably connected together to provide any desired material routing path. Each of the plenums of such sections further is provided with an inlet through which a fluidizing gas may be supplied. In the conventional manner, fluidizing gas introduced into each plenum of such conduits will flow through the porous structure of the inner conduit thereof to form a boundary layer consisting of a mixture of fluidizing air and product particles to reduce the wall friction within the transport line and thus enhance the flowability of the material being conveyed therethrough. A more detailed illustration and description of such a material transport line is provided in U.S. Pat. No. 6,609,871 dated Aug. 26, 2003, U.S. Pat. No. 6,719,500 dated Apr. 13, 2004 and U.S. Pat. No. 6,764,253 dated Jul. 20, 2004, which are incorporated herein by reference.

Gas supply system 17 includes a main supply line 23 connected to a source of gas under pressure in the range of 60 to 100 psig. The gas may consist of air, an inert gas or some other suitable gas depending upon the material being conveyed. The line further is provided with a main control valve 24 operated by a solenoid 25, a flow control valve 26 operated by a solenoid 27 and a pressure regulator 28 having an output in the range of 40 to 60 psig. Interconnecting main line 17 at a point between pressure regulator 28 and control valve 26, and the plenum between the pervious wall 21 and the outer impervious wall of hopper 20 is a branch line 29 having a manual flow control valve 30. Interconnecting main line 17 downstream of flow control valve 26, and the inlet of the rotor housing of rotary feed valve assembly 15 is a branch line 31 having a manual control valve 32. Further downstream, there is provided a plurality of branch lines 33 each interconnecting main supply line 17 and the plenum of a section 22 of material transport line 16. Each of such branch lines is provided with a manual flow control valve 34 across which there is provided a bypass line having a reverse cleaning pulse valve 35 operated by a solenoid 36. In addition, main line 23 is provided with a branch line 37 provided with a further branch line 38 which connects with chambers of the housing of apparatus 14 disposed between the partitions of filter material and the side walls of the housing. Branch line 37 further is provided with a flow control valve 39 operated by solenoid 40, and branch line 38 is provided with flow control valve 41 operated by solenoid 42. The two chambers within the housing of the filling apparatus are vented through a pair of lines provided with four way control valves 43 and 44 actuated by solenoids 45 and 46, respectively.

Control unit 18 is of a conventional construction and is programmable to operate various solenoid actuated valves responsive to various signals from the weighing scale representing different weight values. The control unit further is provided with a variable frequency AC inverter which functions to control the speed of the motor of the rotary feed valve assembly.

With the controller suitably programmed, holding vessel 13 filled with bulk material to be conveyed to receptacle 11 and the access spout of the receptacle fitted about the lower end of the housing of the filling apparatus, the system as described may be operated to convey a measured amount of bulk material from holding vessel 13 to receptacle 11 by executing the program in the controller to sequentially energize various solenoids. Initially, valves 24 and 26 are opened to pressurize main line 23. Valve 32 is then manually opened to provide motive air under pressure in the range of 40 to 60 psig to flow through the rotary feed valve of assembly 15, material transport line 16 and filling apparatus 14 into receptacle 11. Flow control valves 30 and 34 are then opened to supply fluidizing gas to the hopper section of vessel 13 and the annular plenums of transport line sections 35 through branch lines 33. The drive motor of the rotary feed valve assembly is then energized to rotate the rotor of assembly 15 and thus feed material from vessel 13 into the material conveying passageway of transport line 16. As such material flows into receptacle 11, the transporting air is vented through valves 43 and 44 into the dust collection system of the facility. Material particles entrained in such vented gases in the form of dust are filtered out of the venting gases by the filter materials of the filling apparatus.

The motive air injected into the material flow passageway of the transport line will be at a pressure in the range 40 to 60 psi, sufficient to propel the material fed into material transport line to the receptacle, and the fluidizing air supplied to the various plenums of the system will be at a lower pressure than the pressure of the motive gas.

In the continuing operation of the system, the controller will function in response to signals from the weighing scale representing net weights up to a selected net weight operate solenoid 27 to provide a continuous flow of gas through the material transport line to achieve a continuous flow, and will operate the drive motor of assembly 15 at a first speed to feed material from vessel 13 into the material transport line at a first feed rate. Upon the controller receiving a signal from the weighing scale representing a weight value between a first weight and a second weight greater than first weight, the controller will function to operate solenoid 27 causing valve 26 to pulsate, and operate the drive motor of assembly 15 at a slower speed, correspondingly causing the rotor of the assembly to introduce material into the material transporting line at a lower feed rate. Under such circumstances, material transported from vessel 13 to receptacle 11 will be conveyed at a slower feed rate. Then, in response to a further signal of the weighing scale representing the attainment of the second weight value, the controller functions to de-energize solenoid 27 and thus close flow control valve 26 and de-energize drive motor of assembly 15 thus discontinuing the feed of material from vessel 13 into the material transport line.

In the course of the operation of the system as described, periodically the controller will function to energize solenoids 36 in sequence along the material transporting line to correspondingly sequentially open valves 35 and thus inject burst of high pressure gas into the plenums of sections 22 to dislodge material which may have deposited on the inner conduits of such sections precluding the flow of fluidizing gas. In addition, the controller functions to sequentially energize solenoid 45 to close valve 43, energize solenoid 42 to instantaneously open valve 41 and thus allow a burst of high pressure air to enter a chamber of apparatus 14 to dislodge material deposited on the pressure side of the filter material, de-energize solenoid 45 to open valve 43, energize solenoid 46 to close valve 44, instantaneously energize solenoid 40 to open valve 39 and introduce a burst of high pressure gas into the other chamber of apparatus 14 to dislodge material deposited on the pressure side of the filter medium thereof and then de-energize solenoid 46 to open valve 44. Under such sequence of operation, one side of the filling apparatus will function to vent motive gases emanating from receptacle 11 as material entrained in such gases are filtered out by one side of the filter material, while the other side of the apparatus will function to isolate the associated chamber from the vent line and cause the injection of a burst of high pressure gas to dislodge material accumulated on the other side of the filter material.

The controller may be programmed to set any weight values desired. The system will operate at a comparatively high flow rate up to a certain weight value approaching the final weight value and then will automatically operate at a comparatively slower feed rate to permit the final weight value to be reached more slowly and precisely. The supply of fluidizing gas to the hopper section of the material holding vessel, the material transport line and possibly the housing and rotor components of the rotary feed valve assembly functions to provide a free flow of material through the system during either the continuous or pulsating modes of operation of the system. The periodic and sequential injection of bursts of high pressure gas through the pervious membranes of the various components of the system further assures the free flow of material through the system. The periodic injection of bursts of high pressure gas alternatively on different sides of the filling apparatus to dislodge filtered material on the filtering mediums thereof further functions to capture all of the material being conveyed from the holding vessel to the receptacle being filled.

The system illustrated in FIG. 1 and previously described is particularly suitable for conveying measured amounts of fine bulk materials such as carbon black, titanium oxide and the like.

Figure 2:
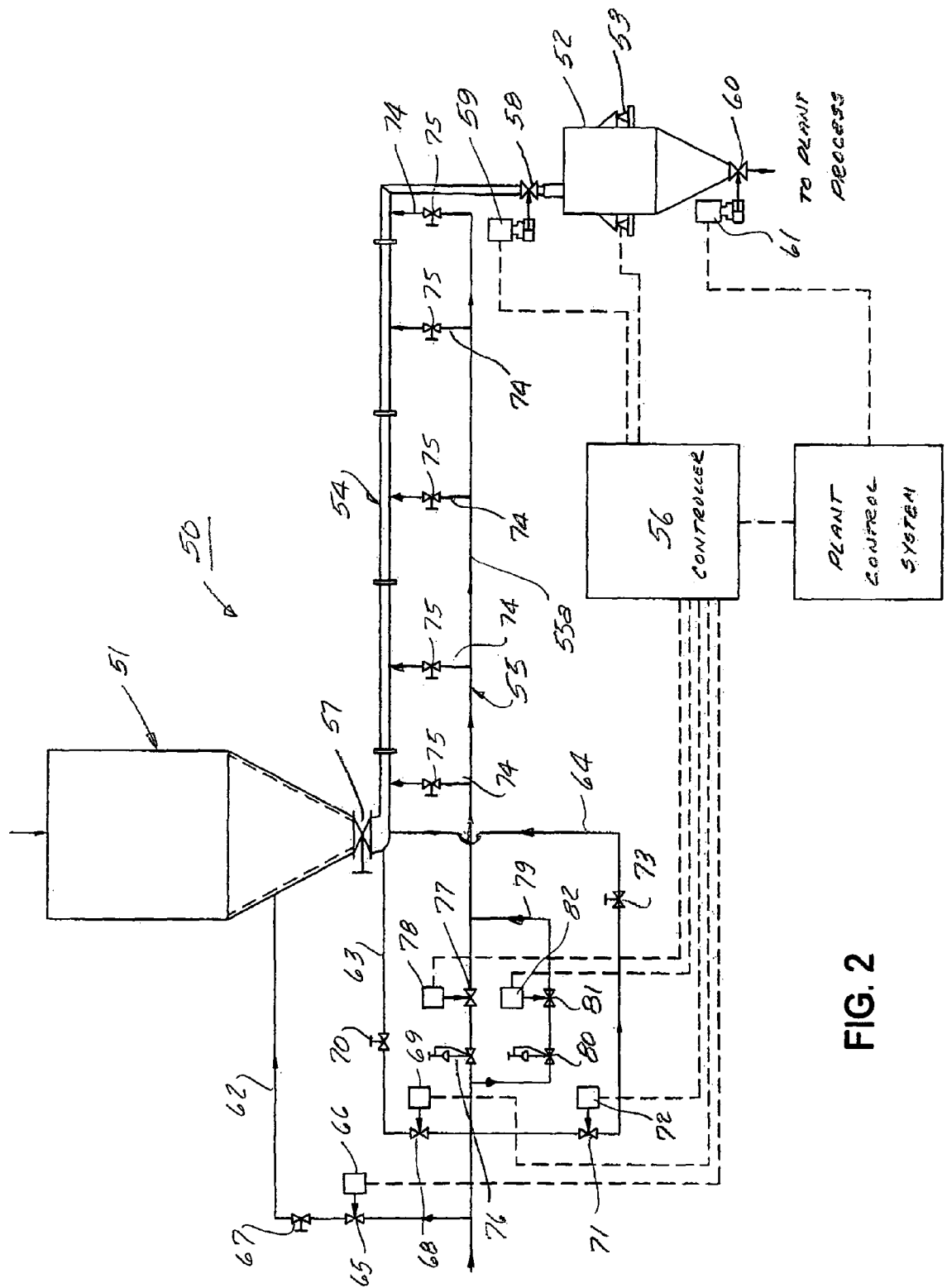
FIG. 2 is a diagrammatic-schematic view of another system embodying the present invention.

FIG. 2 illustrates a system 50 which is a modification of the system shown in FIG. 1 and generally consists of a material holding vessel 51, a weighing vessel 52 provided with load cells 53, a material transport line 54 interconnecting the material holding vessel and weighing vessel 52, an air supply system 55 and a programmable logic controller 56 operatively connected to various solenoids for actuating valves of the gas supply system and receiving input signals from load cells 53. Material holding vessel 51 is essentially similar in construction to holding vessel 13 described in connection with the system shown in FIG. 1. Material transport line 54 also is similar in construction and function to transport line 16 described in connection with system 10. Material in holding vessel 51 is gravity fed into transport line 54 through a manually operated valve 57. Weigh hopper 52 is of a conventional construction, supported on load cells 53, having an inlet valve 58 actuated by a solenoid 59 and an outlet valve 60 actuated by a solenoid 61.

Gas supply system 55 is provided with a main line 55a having branch lines 62, 63 and 64. Branch line 62 communicates with the plenum between the outer wall and the inner, spaced pervious wall in the hopper section of the holding vessel to supply fluidizing gas therein, and is provided with a flow control valve 65 actuated by a solenoid 66 and a manual flow control valve 67. Branch line 63 communicates with the upstream end of the transport line at the point where material from the holding vessel gravity flows into the transport line and functions to inject gas under pressure into the transport line for pneumatically conveying material therealong, and is provided with a flow control valve 68 actuated by a solenoid 69 and a manual flow control valve 70. Branch line 64 also communicates with the downstream end of the transport line at the point where material is fed into the transport line for injecting bursts of high pressure gas for breaking up any accumulation of material in the transport line tending to obstruct the flow of material therein, and is provided with a flow control valve 71 actuated by a solenoid 72 and a manual flow control valve 73. Main gas supply line 55a further is provided with a plurality of branch lines 74, each communicating with a plenum of a transport line section for supplying fluidizing air thereto, and provided with a manual control valve 75. Also provided on main line 55a ahead of branch lines 74 is a pressure control valve 76 and a flow control valve 77 actuated by a solenoid 78. Bypassing pressure control valve 76 and flow control valve 77 is a line 79 provided with a pressure control valve 80 and a flow control valve 81 actuated by a solenoid 82. Pressure control valves 76 and 80 are selected or set for valve 76 to provide a continuous, high flow rate and valve 80 to provide a pulsating, slow flow rate. As in the previously described embodiment, gas supply line 55a is connected to a source of gas under pressure in the range of 60 to 100 psig. The gas used may be air, an inert gas or any other suitable gas depending upon the material being conveyed. Each of the solenoids is electrically connected to and thus operated by controller 56.

As in the previously described embodiment, controller 56 would be programmed to sequentially operate the various solenoids to provide for pneumatically conveying measured amounts of material from the holding vessel to the weight hopper, responsive to signals transmitted by the load cells representing net weight values of material deposited in the weigh hopper.

In the operation of the system shown in FIG. 2, after valve 57 was opened to allow material from the holding vessel to gravity flow into the transport line and manual valves 67, 70, 73 and 75 were opened, controller 56 would function to energize solenoids 66, 69, 78 and 59 to correspondingly open flow control valves 65, 68, 77 and 58. Under such condition, a constant flow of fluidizing gas would be supplied through branch line 62 to the hopper section of the holding vessel and through branch lines 74 to the sections of the transport line, and a motive gas at a constant flow rate would be injected through branch line 63 into the transport line to pneumatically convey material gravity fed into the transport line to the weigh hopper. Such operation would continue until a certain signal was transmitted to the controller indicating a certain net weight of material in the weigh hopper, whereupon the controller would function to operate solenoid 69 to intermittently open valve 68 to provide a pulsating flow of gas into the transport line, operate solenoid 78 to close valve 77 and energize solenoid 82 to intermittently operate valve 81 to provide a pulsating flow of fluidizing air to the sections of the transport line. Upon the load cells transmitting a further signal to the controller indicating a certain net weight of material having been deposited in the weigh hopper, the controller would operate the various solenoids to close valves 58, 65, 68 and 81 to discontinue the operation of the system. During the operation of the system, controller 56 further would function to periodically operate solenoid 72 to instantaneously open valve 71 and thus inject a burst of high pressure gas through line 64 into the downstream end of the transport line to break up any material having accumulated at such point and thus obstructed the free flow of material into the transport line to be pneumatically conveyed to the weigh hopper. After the measured amount of material has been conveyed to hopper 52, solenoid 61 may be energized to open valve 60 and thus discharge the measured amount of material into a processing tank or other receptacle.

The pneumatic conveying of material first under a continuous flow mode and then under a pulsating flow mode, along with the fluidization of the material, provides a controlled operation which permits the conveyance of precisely measured amounts of product. The sectional configuration of the transport line permits not only the flexibility of erecting different routing paths of the material but facilitates the disassembly, cleaning and reassembly of the transport line. In addition, the filling apparatus described in connection with the first embodiment provides for not only dust control but for the recovery of material and thus greater productivity.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

We claim:

1. A system for transporting a measured amount of a bulk material from a first site to a remote receptacle, comprising:
   means for holding a mass of said material to be transported to said receptacle;
   means for transporting said material from said holding means to said receptacle;
   means for injecting a gas under pressure into said transporting means for pneumatically conveying material received from said holding means to said receptacle, operable in continuous or intermittent modes;
   means for sensing the net weight of said receptacle; and
   a programmable logic controller operatively connected to said sensing means and said injecting means, programmed to operate responsive to a weight of said receptacle up to a first weight for operating said injection means in said continuous mode, a weight of said receptacle between said first weight and up to a second weight greater than said first weight for operating said injection means in said intermittent mode and to said second weight for discontinuing said injection means.

2. A system according to claim 1 including a valve disposed between said holding means and said transporting means selectively operable to allow material from said holding means to gravity flow into said transporting means.

3. A system according to claim 1 including means for fluidizing the material in said holding means to enhance the flowability thereof.

4. A system according to claim 1 including means for fluidizing the material in said transporting means to enhance the flowability thereof.

5. A system according to claim 1 including means for varying the pressure of fluidizing gas supplied to said transporting means, along the length thereof.

6. A system according to claim 5 wherein the pressure of said fluidizing gas diminishes along said transporting means from said holding means to said receptacle.

7. A system according to claim 4 wherein said controller is operable to selectively cause said injection means to inject bursts of high pressure gas through pores of material through which said fluidized gas is supplied for dislodging any material tending to clog said pores.

8. A system according to claim 7 wherein said controller is operable to cause said injection means to inject said bursts of high pressure gas periodically and sequentially along the length of said transporting means.

9. A system according to claim 1 wherein said transporting means comprises at least two conduits detachably connected together in end-to-end relation, selected from a group of conduits of different configurations, to form a selected material routing path.

10. A system according to claim 1 wherein said weight sensing means comprises load cells.

11. A system for transporting measured amounts of a bulk material from a first site to a remote receptacle, comprising:
    means for holding a mass of said material to be transported to said receptacle;
    means for transporting said material from said holding means to said receptacle;
    a rotary feeder valve having an inlet communicating with an outlet of said material holding means, an outlet communicating with said transporting means and a variable speed motor drivingly connected to a rotor thereof;
    means for injecting a gas under pressure into said transporting means for pneumatically conveying material received from said rotary feed valve to said receptacle, operable in continuous or intermittent modes;
    means for sensing the weight of said receptacle; and
    a control unit operatively connected to said drive motor and said injecting means, operable responsive to a weight of said receptacle up to a first weight for operating said drive of said rotary feed valve at a first speed and said injecting means in said continuous mode, a weight of said container between said first weight of said receptacle and up to a second weight greater than said first weight for operating said drive motor at a second speed lower than said first speed and said injecting means in said intermittent mode and to said second weight for discontinuing said drive motor and said injecting means.

12. A system according to claim 11 wherein said injecting means is operable in injecting a gas into said transporting means at a pressure in the range of 40 to 100 psig.

13. A system according to claim 11 including means for fluidizing the material in said holding means to enhance the flowability thereof.

14. A system according to claim 11 including means for fluidizing the material in said transporting means to enhance the flowability thereof.

15. A system according to claim 11 wherein an inlet of said rotary feeder valve includes means for fluidizing said material fed thereinto to enhance the passage of said material therethrough.

16. A system according to claim 11 wherein pockets of a rotor of said rotary feeder valve includes means for fluidizing said material carried therein to enhance the passage of said material therethrough.

17. A system according to claim 11 wherein a housing of said rotary feeder valve includes means for fluidizing material carried by pockets of a rotor thereof to enhance the flowability of said material through the outlet thereof.

18. A system according to claim 14 wherein said transporting means includes a first conduit formed of a gas permeable material communicating with said gas injecting means for receiving a material propelling gas therethrough and a second conduit formed of an impermeable material encompassing and spaced from said first conduit, forming a plenum therebetween and means for supplying said fluidizing as into said plenum.

19. A system according to claim 18 wherein the pressure of said propelling gas is greater than the pressure of said fluidizing gas.

20. A system according to claim 19 wherein said controller is operatively connected to said fluidizing gas supplying means and is operable to periodically cause said fluidizing gas supplying means to inject bursts of high pressure gas into said plenum for dislodging material which may have lodged on the interior of said first conduit.

21. A system according to claim 18 wherein said plenum is provided with partitions spaced along the length thereof providing a plurality of plenums disposed along the length of said transporting means, and said fluidizing gas is supplied to each of said plenums.

22. A system according to claim 21 wherein the pressure of fluidizing gas supplied to said plenums varies.

23. A system according to claim 21 wherein the pressure of fluidizing gas within said plenums decreases along the length of said transporting means.

24. A system according to claim 21 wherein said controller is operatively connected to said fluidizing gas supplying means and is operable to cause said fluidizing gas supplying means to inject bursts of high pressure gas into said plenums for dislodging material which may have lodged on the interior of said first conduit.

25. A system according to claim 11 wherein said variable speed motor is electrical and the speed thereof is controlled by a variable frequency AC inverter.

26. A system according to claim 24 wherein said bursts are caused periodically and sequentially along the length of said transporting means.

27. A system according to claim 11 wherein said transporting means comprises at least two conduits detachably connected together in end-to-end relation, selected from a group of conduits of different configurations to provide a selected routing path.

28. A system according to claim 11 wherein said weight sensing means comprises load cells.

29. A system according to claim 1 wherein the pressure of said gas injected into said transporting means is in the range of 60 to 100 psig.

30. A system according to claim 11 including means for forming a seal between and outlet of said transporting means and an inlet of said receptacle.

31. A system according to claim 11 including means for venting gas used to pneumatically convey material into said receptacle.

32. A system according to claim 31 including means for filtering material entrained in said gas being vented.

33. A system according to claim 32 including means for injecting bursts of gas into said venting means for dislodging filtered material deposited on said filtering means.

34. A system according to claim 33 wherein said controller is operable to cause said bursts of gas into said venting means, periodically.

35. A method of transporting a measured amount of a bulk material from a holding means to a remote receptacle, comprising:
   providing a means for receiving material from said holding means and conducting said material to said receptacle;
   injecting a gas under pressure to pneumatically convey said material in said conducting means;
   sensing the weight of material deposited into said receptacle;
   operating said injection means to produce a continuous flow of material at a selected flow rate up to a sensed first weight of said material in said receptacle;
   operating said injection means to produce a pulsating flow of gas between said sensed first weight of said material and up to a second sensed weight of said material greater than said first weight; and
   discontinuing the operation of said injecting means upon sensing said second weight.

36. The method of claim 35 including fluidizing the material in said holding means to enhance the flowability thereof.

37. The method of claim 35 including fluidizing the material In said material conducting means to enhance the flowability thereof.

38. The method of claim 37 including varying the pressure of fluidizing gas supplied to said conducting means, along the length thereof.

39. The method of claim 38 including decreasing the pressure of said fluidizing gas along the length thereof.

40. The method of claim 37 including injecting bursts of high pressure gas through pores of material through which said fluidizing gas is supplied for dislodging material tending to clog said pores.

41. The method according to claim 40 including injecting said bursts of high pressure gas periodically and sequentially along the length of said conducting means.

42. A method according to claim 35 including forming said conducting means with at least two conduits detachably connected together in end-to-end relation, selected from a group of conduits having different configurations, to form a selected routing path.

43. A method according to claim 35 including metering material fed from said holding means into said conducting means by means of a rotary feed valve having a rotor driven by a variable speed motor.

44. A method according to claim 43 including operating said motor at a first speed to produce a continuous feed rate up to said sensed first weight of said material in said container;
   operating said motor at a second speed lower than said first speed between said sensed first weight of said material in said receptacle and said sensed second weight; and
   discontinuing the operation of said motor upon sensing said second weight.

45. The method of claim 44 including fluidizing the material in said holding means to enhance the flowability thereof.

46. The method of claim 44 including fluidizing the material in said rotary feed valve to enhance the passage thereof therethrough.

47. The method of claim 44 including fluidizing the material ill said conducting means to enhance the flowability thereof.

48. The method of claim 47, including injecting bursts of high pressure gas through pores of material through which said fluidizing gas is supplied to said conducting means for dislodging material tending to clog said pores.

49. The method of claim 48 including injecting said bursts of high pressure gas periodically and sequentially along the length of said conducting means.

50. A method according to claim 44 including forming said conducting means with at least two conduits detachably connected together in end to end relation, selected from a group of conduits having different configurations, to form a selected path.

* * * * *

UNITED STATES PATENT AND TRADEMARK OFFICE
CERTIFICATE OF CORRECTION

PATENT NO.       : 7,850,047 B2                            Page 1 of 1
APPLICATION NO.  : 11/033510
DATED            : December 14, 2010
INVENTOR(S)      : Anthony E. Boroch et al.

It is certified that error appears in the above-identified patent and that said Letters Patent is hereby corrected as shown below:

Col. 9, lines 28-30; Claim 30 should read - "A system according to claim 11 including means for forming a seal between an outlet of said transporting means and an inlet of said receptacle."
Currently a first "and" is in the place where the "an" should be. Please replace "and" with "an" in the first instance.

Col. 10, lines 42-44; Claim 47 should read - "The method of claim 44 including fluidizing the material in said conducting means to enhance the flowability thereof."
Currently "ill" is in place of "in". Please replace "ill" with "in".

Signed and Sealed this
Fifth Day of July, 2011

David J. Kappos
*Director of the United States Patent and Trademark Office*